(12) United States Patent
Clauss et al.

(10) Patent No.: US 10,131,752 B2
(45) Date of Patent: Nov. 20, 2018

(54) POLYMER NANOCOMPOSITES

(71) Applicant: RELIANCE INDUSTRIES LIMITED, Mumbai (IN)

(72) Inventors: Allen David Clauss, Madison, WI (US); Brian Jeffrey Koth, Madison, WI (US); Guiquan Pan, Middleton, WI (US); Nicholas Richard Wietfeldt, Madison, WI (US); Matthew Clayton Hall, Madison, WI (US)

(73) Assignee: RELIANCE INDUSTRIES LIMITED, Mumbai (IN)

( * ) Notice: Subject to any disclaimer, the term of this patent is extended or adjusted under 35 U.S.C. 154(b) by 206 days.

(21) Appl. No.: 14/776,026

(22) PCT Filed: Mar. 14, 2014

(86) PCT No.: PCT/US2014/028432
§ 371 (c)(1),
(2) Date: Sep. 14, 2015

(87) PCT Pub. No.: WO2014/144144
PCT Pub. Date: Sep. 18, 2014

(65) Prior Publication Data
US 2016/0032062 A1 Feb. 4, 2016

Related U.S. Application Data

(60) Provisional application No. 61/787,402, filed on Mar. 15, 2013.

(51) Int. Cl.
*C08J 3/205* (2006.01)
*C08J 5/00* (2006.01)
*C08K 3/04* (2006.01)
*C08K 7/24* (2006.01)
*C08J 3/20* (2006.01)
*C08J 3/215* (2006.01)
*B82Y 30/00* (2011.01)

(52) U.S. Cl.
CPC .............. *C08J 5/00* (2013.01); *C08J 3/201* (2013.01); *C08J 3/2053* (2013.01); *C08J 3/215* (2013.01); *C08K 3/04* (2013.01); *C08K 7/24* (2013.01); *B82Y 30/00* (2013.01); *C08J 2363/00* (2013.01); *C08K 2201/011* (2013.01); *C08K 2201/014* (2013.01)

(58) Field of Classification Search
None
See application file for complete search history.

(56) References Cited

U.S. PATENT DOCUMENTS

| | | | | |
|---|---|---|---|---|
| 2008/0090951 A1* | 4/2008 | Mao | ...................... | B82Y 30/00 524/445 |
| 2011/0220851 A1* | 9/2011 | Sue | ..................... | C08K 7/00 252/507 |
| 2012/0128878 A1* | 5/2012 | Li | ......................... | B82Y 30/00 427/215 |
| 2012/0329640 A1* | 12/2012 | Bosnyak | .................. | C09C 1/44 502/100 |

* cited by examiner

*Primary Examiner* — Michael J Feely
(74) *Attorney, Agent, or Firm* — Fish IP Law, LLP

(57) ABSTRACT

Provided herein is technology relating to polymer nanocomposites, and particularly, but not exclusively, to polymer nanocomposites comprising two or more nanomaterials and methods of producing nanocomposites comprising two or more nanomaterials.

4 Claims, 5 Drawing Sheets

POLYMER NANOCOMPOSITES

CROSS-REFERENCE TO RELATED APPLICATIONS

This application is a 371 U.S. National Phase Entry of pending International Application No. PCT/US2014/028432, filed Mar. 14, 2014, which claims priority to U.S. provisional patent application Ser. No. 61/787,402, filed Mar. 15, 2013, the contents of which are incorporated by reference in their entireties.

FIELD OF INVENTION

Provided herein is technology relating to polymer nanocomposites, and particularly, but not exclusively, to polymer nanocomposites comprising two or more nanomaterials and methods of producing nanocomposites comprising two or more nanomaterials.

BACKGROUND

Polymer nanocomposites consisting of a single type of nanomaterial dispersed in a polymer matrix have been the subject of much research and development activity in recent years. In particular, these materials have attracted interest because they have many desirable performance attributes related to mechanical properties, electrical conductivity, thermal conductivity, gas/vapor barrier properties, etc. While a significant number of polymer nanocomposites of this type have been developed and/or commercialized, conventional polymer nanocomposites suffer from limitations related to suboptimal dispersion of the nanomaterial in the polymer matrix that attenuates these desirable performance attributes. For example, when nanomaterials in powder form are melt blended with polymers using extruders and conventional fillers under typical compounding conditions, the resultant composites exhibit suboptimal exfoliation and dispersion of the nanomaterial in the polymer matrix. As a result, the materials have performance characteristics that are far below a theoretical magnitude of performance enhancement predicted to be provided by the nanomaterials. Technologies have been developed to produce highly exfoliated solutions, dispersions, slurries, or wet cakes by solvent exfoliation of individual nanomaterials using solvent systems. Though these materials can be co-dispersed with polymer solutions or polymer dispersions, followed by removal of the solvent to produce polymer nanocomposites with improved exfoliation and dispersion of the nanomaterial, the performance attributes of these composites are also typically below theoretical levels due to incomplete exfoliation and dispersion of the nanomaterial.

SUMMARY

Accordingly, provided herein is technology related to polymer nanocomposites containing mixtures of two or more different nanomaterials. In particular, during the development of embodiments of the technology, it was discovered that solvent co-exfoliation of two or more different nanomaterials in the same solution or dispersion followed by incorporation of the nanomaterial mixtures into a polymer composite results in a nanocomposite material possessing improved performance attributes relative to conventional materials. While an understanding of the mechanism for these improved characteristics is not necessary to practice the technology, it is believed that co-exfoliating the two or more nanomaterials results in solutions, dispersions, slurries, or wet cakes that are more resistant to re-agglomeration due to interference between or among the different particle morphologies (e.g., different sizes, shapes, etc.) of the different nanomaterials.

For example, when a dispersion of a single nanomaterial, such as graphene nanoplatelets, is used to make a polymer composite by conventional methods, the nanoplatelets agglomerate (e.g., by restacking) as the graphene/polymer dispersion is concentrated during solvent removal. In contrast, the technology provided herein relates to polymer nanocomposites comprising two or more nanomaterials that have related structures and surface energies but that also have different particle morphologies (e.g., graphene sheets and carbon nanotubes, which are shaped as platelets and tubes, respectively). As a result of their different morphologies, the multiple types of nanomaterials do not stably self-agglomerate nor do they stably agglomerate with each other because each nanomaterial interferes with the agglomeration of the other nanomaterial and consequently minimizes or eliminates agglomeration of the nanomaterials in the composite. Thus, both materials exhibit a high degree of exfoliation and dispersion in the resultant polymer composite. In addition, a more efficient interactive network of materials can be established in a composite consisting of nanomaterials having multiple morphologies (e.g., platelets and tubes) relative to a composite comprising a single nanomaterial having particles of the same morphology. As a result, the electrical conductivity and thermal conductivity, which are related to the interactive network of nanomaterials in the composites, are enhanced in materials consisting of nanomaterials having multiple morphologies.

Accordingly, provided herein are embodiments of a polymer nanocomposite comprising a polymer; a first liquid phase exfoliated (e.g., solvent exfoliated or surfactant exfoliated) pristine nanomaterial comprising a first morphology; and a second nanomaterial comprising a distinctly different particle morphology than the first nanomaterial. For example, in some embodiments the polymer nanocomposite comprises pristine graphene nanoplatelets and carbon nanotubes. In some embodiments, the second nanomaterial is a solvent exfoliated or surfactant exfoliated nanomaterial, e.g., a liquid phase exfoliated nanomaterial prepared by exfoliating the second nanomaterial in the presence of the first nanomaterial using a common or combined liquid exfoliating medium. For example, in some embodiments, the second nanomaterial is exfoliated using a composition comprising the first liquid phase exfoliated pristine nanomaterial and a solvent or surfactant.

Furthermore, the compositions are not limited in the ratios of the nanomaterials. In some embodiments, the first solvent exfoliated pristine nanomaterial and the second nanomaterial are present in a weight ratio of from 1:60 to 60:1, e.g., 1:60, 1:55, 1:50, 1:45, 1:40, 1:35, 1:30, 1:25, 1:20, 1:15, 1:10, 1:5, 1:4, 3:10, 1:3, 1:2, 1:1, 2:1, 3:1, 10:3, 4:1, 5:1, 10:1, 15:1, 20:1, 25:1, 30:1, 35:1, 40:1, 45:1, 50:1, 55:1, 60:1, and intermediate ratios therebetween.

The technology is not limited in the types of polymers that are used. For example, in some embodiments the polymer is a thermoset polymer and in some embodiments the polymer is a thermoplastic polymer. Exemplary embodiments provide a polymer that is an epoxy or a polypropylene.

The polymer nanocomposites provided have a number of desirable characteristics. For example, the technology encompasses polymer nanocomposites having a characteristic of improved electrical resistivity, e.g., in some embodiments the polymer nanocomposites have an electrical resistivity of less than $10^3$, less than $10^4$, less than $10^5$, less than $10^6$, less than $10^7$, less than $10^8$, less than $10^9$, less than $10^{10}$, less than $10^{11}$, and/or less than $10^{12}$ Ohm-cm. In some embodiments, the polymer nanocomposite compositions comprising a first and a second nanomaterial have an electrical resistivity that is less than a nanocomposite composition comprising either the first or the second nanomaterial alone. In some embodiments, the polymer nanocomposite compositions have an electrical resistivity that is less than one-tenth the electrical resistivity of a nanocomposite comprising the polymer and the first solvent exfoliated pristine nanomaterial or that is less than one-tenth the electrical resistivity of a nanocomposite comprising the polymer and the second nanomaterial.

The polymer nanocomposites have properties that are different than what is expected from combining the properties attributable to the first and second nanomaterials. For example, the electrical resistivity data demonstrate that the polymer nanocomposite compositions provided herein have an increased conductance of electricity that is more efficient than the additive contribution of each nanomaterial alone.

Accordingly, the technology provided herein is related to a polymer nanocomposite comprising a solvent coexfoliated mixture of pristine nanomaterials in a highly exfoliated state comprising two or more distinctly different particle morphologies, e.g., a polymer nanocomposite wherein the mixture of nanomaterial comprises graphene nanoplatelets and carbon nanotubes.

In another aspect the technology is related to embodiments of methods for making a polymer nanocomposite. Embodiments of methods comprise exfoliating a first nanomaterial by solvent exfoliation to produce a first solution or stable dispersion of the first nanomaterial; exfoliating a second nanomaterial having a different particle morphology than the first nanomaterial with the first solution or stable dispersion of the first nanomaterial to provide a second solution or stable dispersion containing the first and second nanomaterials; introducing the second solution or stable dispersion into a polymer matrix; and removing solvents from said matrix to provide a polymer nanocomposite. In some embodiments, the first exfoliated nanomaterial catalyzes or accelerates the exfoliation of a second nanomaterial of different morphology but similar surface energy. In some embodiments, the method further comprises curing the polymer nanocomposite, e.g., by adding a curing agent. An exemplary method of making a polymer nanocomposite is provided wherein the first nanomaterial is pristine graphene nanoplatelets and the second nanomaterial is carbon nanotubes. The methods are not limited in the ratio in which the components are mixed. For example, in some embodiments the second solution or stable dispersion contains the first and second nanomaterials at a weight ratio of from 1:60 to 60:1, e.g., 1:60, 1:55, 1:50, 1:45, 1:40, 1:35, 1:30, 1:25, 1:20, 1:15, 1:10, 1:5, 1:4, 3:10, 1:3, 1:2, 1:1, 2:1, 3:1, 10:3, 4:1, 5:1, 10:1, 15:1, 20:1, 25:1, 30:1, 35:1, 40:1, 45:1, 50:1, 55:1, 60:1, and intermediate ratios therebetween. In some embodiments, the polymer nanocomposite produced from the second solution or stable dispersion contains the first and second nanomaterials at a weight ratio of from 1:60 to 60:1, e.g., 1:60, 1:55, 1:50, 1:45, 1:40, 1:35, 1:30, 1:25, 1:20, 1:15, 1:10, 1:5, 1:4, 3:10, 1:3, 1:2, 1:1, 2:1, 3:1, 10:3, 4:1, 5:1, 10:1, 15:1, 20:1, 25:1, 30:1, 35:1, 40:1, 45:1, 50:1, 55:1, 60:1, and intermediate ratios therebetween. The methods are not limited in the types of polymers that are used—e.g., in some embodiments the polymer is a thermoset polymer and in some embodiments the polymer is a thermoplastic polymer. An exemplary method uses a polymer that is epoxy or polypropylene.

In some embodiments, the methods produce a polymer nanocomposite with one or more particularly improved characteristics. For example, some embodiments of the methods produce a polymer nanocomposite that has an electrical resistivity less than $10^3$, less than $10^4$, less than $10^5$, less than $10^6$, less than $10^7$, less than $10^8$, less than $10^9$, less than $10^{10}$, less than $10^{11}$, and/or less than $10^{12}$ Ohm-cm. In some embodiments, the methods produce a polymer nanocomposite composition comprising a first and a second nanomaterial that has an electrical resistivity that is more than a nanocomposite composition comprising either the first or the second nanomaterial alone. In some embodiments, the methods produce a polymer nanocomposite composition that has an electrical resistivity that is less than one-tenth the electrical resistivity of a nanocomposite comprising the polymer and the first solvent exfoliated pristine nanomaterial or that is less than one-tenth the electrical resistivity of a nanocomposite comprising the polymer and the second nanomaterial. In sum, the technology provides a method of making a polymer nanocomposite containing a liquid phase exfoliated mixture of nanomaterials comprising the steps of exfoliating a nanomaterial by liquid phase exfoliation to produce a first solution or stable dispersion of the nanomaterial; exfoliating one or more additional nanomaterials of different particle morphology from the first nanomaterial with the solution or stable dispersion of the first nanomaterial to provide a second solution or stable dispersion containing the two or more nanomaterials in a highly exfoliated state; introducing the second solution or stable dispersion into a polymer matrix; and removing solvents from said matrix to provide a polymer nanocomposite.

The technology provides related embodiments of a polymer nanocomposite produced by a method as described herein, e.g., a polymer composite produced by a method comprising the steps of exfoliating a first nanomaterial by liquid phase exfoliation to produce a first solution or stable dispersion of the first nanomaterial; exfoliating a second nanomaterial having a different particle morphology than the first nanomaterial with the first solution or stable dispersion of the first nanomaterial to provide a second solution or stable dispersion containing the first and second nanomaterials; introducing the second solution or stable dispersion into a polymer matrix; and removing solvents from said matrix to provide a polymer nanocomposite.

In another aspect, the technology is related to embodiments of a polymer nanocomposite prepared by a method comprising exfoliating a first nanomaterial by solvent exfoliation to produce a first solution or stable dispersion of the first nanomaterial; exfoliating a second nanomaterial having a different particle morphology than the first nanomaterial with the first solution or stable dispersion of the first nanomaterial to provide a second solution or stable dispersion containing the first and second nanomaterials; introducing the second solution or stable dispersion into a polymer matrix; and removing solvents from said matrix to provide a polymer nanocomposite. In some embodiments of a polymer nanocomposite prepared according to the methods described herein, the first exfoliated nanomaterial catalyzes or accelerates the exfoliation of a second nanomaterial of different morphology but similar surface energy. In some embodiments, the polymer nanocomposite is prepared according to a method further comprising curing the polymer nanocomposite, e.g., by adding a curing agent. An exemplary polymer nanocomposite is prepared by a method wherein the first nanomaterial is pristine graphene nanoplatelets and the second nanomaterial is carbon nanotubes. The polymer nanocomposites are prepared by methods that are not limited in the ratio in which the components are mixed. For example, in some embodiments of the polymer nanocomposites, the methods comprise using a second solution or stable dispersion that contains the first and second nanomaterials at a weight ratio of from 1:60 to 60:1, e.g., 1:60, 1:55, 1:50, 1:45, 1:40, 1:35, 1:30, 1:25, 1:20, 1:15, 1:10, 1:5, 1:4, 3:10, 1:3, 1:2, 1:1, 2:1, 3:1, 10:3, 4:1, 5:1, 10:1, 15:1, 20:1, 25:1, 30:1, 35:1, 40:1, 45:1, 50:1, 55:1, 60:1, and intermediate ratios therebetween. In some embodiments, the polymer nanocomposite produced from the second solution or stable dispersion contains the first and second nanomaterials at a weight ratio of from 1:60 to 60:1, e.g., 1:60, 1:55, 1:50, 1:45, 1:40, 1:35, 1:30, 1:25, 1:20, 1:15, 1:10, 1:5, 1:4, 3:10, 1:3, 1:2, 1:1, 2:1, 3:1, 10:3, 4:1, 5:1, 10:1, 15:1, 20:1, 25:1, 30:1, 35:1, 40:1, 45:1, 50:1, 55:1, 60:1, and intermediate ratios therebetween. The polymer nanocomposites are prepared by methods that are not limited in the types of polymers that are used—e.g., in some embodiments the polymer is a thermoset polymer and in some embodiments the polymer is a thermoplastic polymer. An exemplary polymer nanocomposite is prepared by a method that uses a polymer that is epoxy or polypropylene.

Additional embodiments will be apparent to persons skilled in the relevant art based on the teachings contained herein.

BRIEF DESCRIPTION OF THE DRAWINGS

These and other features, aspects, and advantages of the present technology will become better understood with regard to the following drawings.

Figure 1:
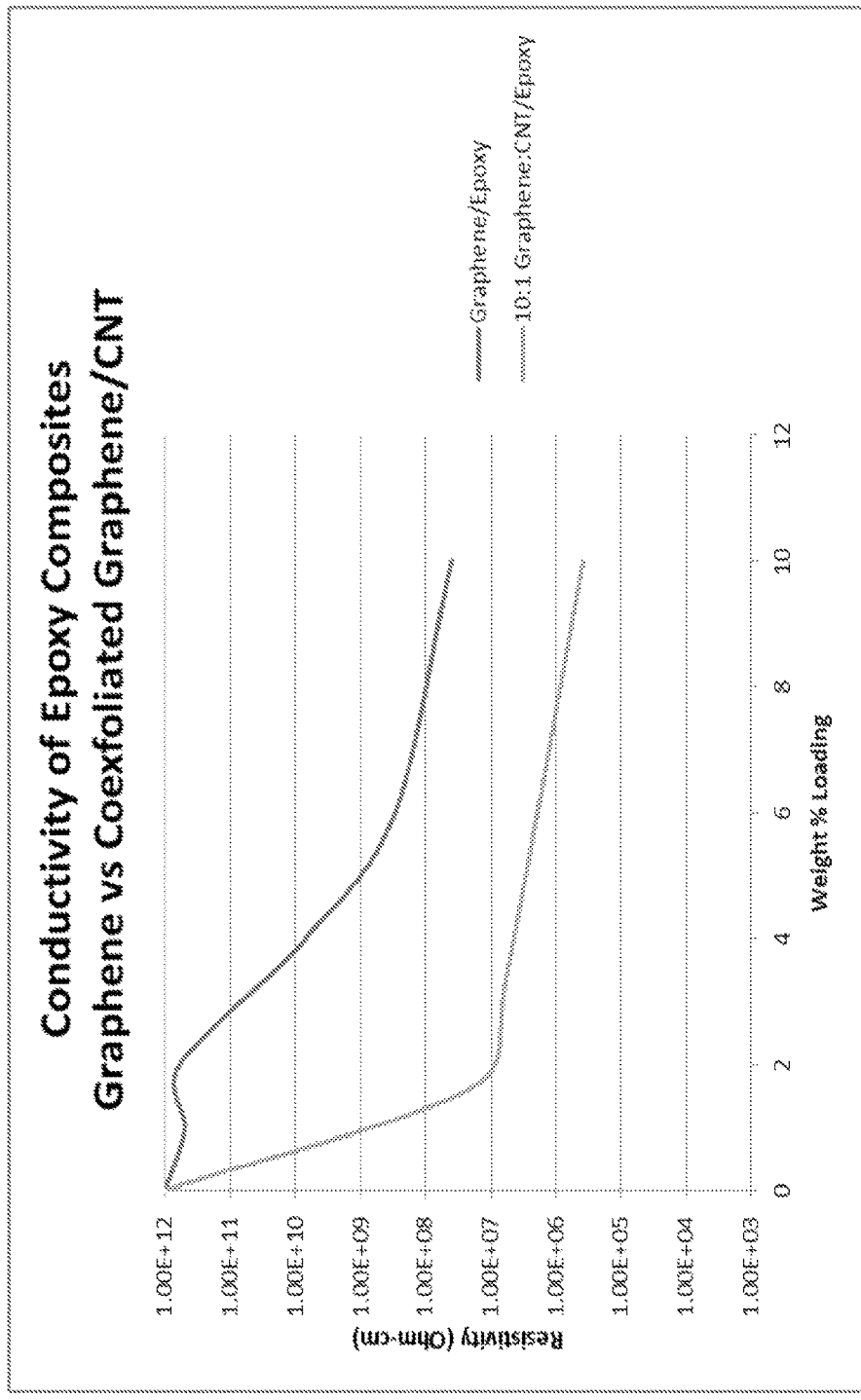
FIG. 1 is a plot showing the relationship between electrical resistivity and weight percent loading of an embodiment of an epoxy polymer nanocomposite according to the technology compared to a conventional polymer nanocomposite.

It is to be understood that the figures are not necessarily drawn to scale, nor are the objects in the figures necessarily drawn to scale in relationship to one another. The figures are depictions that are intended to bring clarity and understanding to various embodiments of apparatuses, systems, and methods disclosed herein. Wherever possible, the same reference numbers will be used throughout the drawings to refer to the same or like parts. Moreover, it should be appreciated that the drawings are not intended to limit the scope of the present teachings in any way.

DETAILED DESCRIPTION

Provided herein is technology relating to polymer nanocomposites, and particularly, but not exclusively, to polymer nanocomposites comprising two or more nanomaterials and methods of producing nanocomposites comprising two or more nanomaterials. In the description of the technology, the section headings used herein are for organizational purposes only and are not to be construed as limiting the described subject matter in any way. Moreover, in this detailed description of the various embodiments, for purposes of explanation, numerous specific details are set forth to provide a thorough understanding of the embodiments disclosed. One skilled in the art will appreciate, however, that these various embodiments may be practiced with or without these specific details. In other instances, structures and devices are shown in block diagram form. Furthermore, one skilled in the art can readily appreciate that the specific sequences in which methods are presented and performed are illustrative and it is contemplated that the sequences can be varied and still remain within the spirit and scope of the various embodiments disclosed herein.

All literature and similar materials cited in this application, including but not limited to, patents, patent applications, articles, books, treatises, and internet web pages are expressly incorporated by reference in their entirety for any purpose. Unless defined otherwise, all technical and scientific terms used herein have the same meaning as is commonly understood by one of ordinary skill in the art to which the various embodiments described herein belongs. When definitions of terms in incorporated references appear to differ from the definitions provided in the present teachings, the definition provided in the present teachings shall control.

Definitions

To facilitate an understanding of the present technology, a number of terms and phrases are defined below. Additional definitions are set forth throughout the detailed description.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator and is equivalent to the term "and/or" unless the context clearly dictates otherwise. The term "based on" is not exclusive and allows for being based on additional factors not described, unless the context clearly dictates otherwise. In addition, throughout the specification, the meaning of "a", "an", and "the" include plural references. The meaning of "in" includes "in" and "on."

As used herein, "graphene" refers to an allotrope of carbon having a structure that is a single planar sheet of $sp^2$-bonded carbon atoms arranged in a honeycomb crystal lattice. As used herein, the term graphene includes but is not limited to graphene in the form of a one-atom-thick (monolayer) sheet. As such, the term "graphene" also refers to the form of graphene in which many graphene sheets are stacked together, e.g., as present in the crystalline or "flake" form of graphite. As used herein, the term "graphene" refers to monolayer (single layer) or multilayer graphene with a nanoscale thickness (e.g., less than 20 and preferably less than 10 layers thick).

As used herein, the term "pristine" means not functionalized, modified, or chemically reacted with other elements such as oxygen.

As used herein, a "nanomaterial" is a material having one or more external dimensions in the size range of 1 nm to 100 nm. The "morphology" of a nanomaterial refers to the shape of the discrete nanomaterial particles.

Embodiments of the Technology

Provided herein is technology providing compositions and methods related to polymer nanocomposites comprising multiple nanomaterials that have distinct morphologies, e.g., graphene nanoplatelets and multiwall carbon nanotubes. The multiple types of nanomaterials inhibit self-agglomeration of individual nanomaterials, thus providing a material with improved attributes relative to conventional nanocomposite materials. For example, the nanocomposite materials provided have an improved electrical conductivity compared to other, e.g., conventional, polymer nanocomposites.

Although the disclosure herein refers to certain illustrated embodiments, it is to be understood that these embodiments are presented by way of example and not by way of limitation.

1. Compositions

The technology provides polymer nanocomposites comprising a polymer or a copolymer and nanomaterials dispersed in the polymer matrix. The nanomaterials may have a range of shapes and/or morphologies, but generally have at least one dimension that is in the range of 1 to 50 nm or 1 to 100 nm As such, a polymer nanocomposite is a multi-phase system (e.g., a blend, composite, foam, etc.)

Materials in the nanometer size range ("nanomaterials") have particular physical and chemical properties (e.g., relative to microparticles, micromaterials, and other larger particles and materials) that result from their high surface area-to-volume ratio and their small sizes. For example, the increase in surface area-to-volume ratio, which increases as the particles size decreases, leads to an increasing dominance of atoms on the surface of the particles relative to those in the interior of the particles. As a consequence, the strength of surface interactions with other materials is increased (e.g., relative to micromaterials). As an example, nanomaterials demonstrate changes in strength (e.g., greater strength), heat resistance (e.g., increased heat resistance), electrical conductivity (e.g., greater electrical conductivity), insulating behavior, magnetic properties, elasticity, optical properties (e.g., color), and reactivity relative to microscale materials.

The technology described herein provides compositions that are or that comprise a polymer nanocomposite. In some embodiments, the polymer nanocomposite comprises multiple nanomaterials that have distinct morphologies, e.g., graphene nanoplatelets and carbon nanotubes (e.g., multiwall carbon nanotubes or single wall carbon nanotubes). For example, some embodiments provide that the nanomaterials are carbon nanomaterials such as a graphene, a fullerene, a nanotube, a nanofiber, or a graphite.

Graphene is an allotrope of carbon having a structure that is a single planar sheet of $sp^2$-bonded carbon atoms arranged in a honeycomb crystal lattice. As a result of its molecular composition and structure, graphene has unique physical properties (e.g., electronic properties, optical properties, thermal properties, quantum-based properties, etc.) and is amongst the strongest materials known. In some embodiments, graphene is a one-atom-thick (monolayer) sheet and in some embodiments (e.g., "few-layer" graphene), many graphene sheets are stacked together. Typically, graphene has a thickness less than 20 and more preferably less than 10 layers.

The technology is not limited in the source of the nanomaterials. For example, in some embodiments graphene (e.g., pristine graphene) is produced by solvent exfoliation of graphite, e.g., as discussed in U.S. Pat. Appl. Pub. No. 2011/0117361. In some embodiments, graphene is a composition and/or is produced by a method as described in co-pending U.S. Pat. Appl. Ser. No 61/786,944, which is incorporated herein by reference. Similar procedures produce monolayer graphene from multi-layer graphene, few-layer graphene, or bulk graphene. As discussed therein, solvents for producing graphene from graphite include those with a Flory-Huggins parameter (chi value) of less than 0.10 (e.g., solvents with a chi value of less than 0.09, less than 0.08, less than 0.07, less than 0.06, less than 0.05, less than 0.04, less than 0.03, less than 0.02, and/or less than 0.01) and that have a surface tension of approximately 38.4 mJ/m$^2$ to 40.4 mJ/m$^2$. Exemplary solvents for graphene that have these characteristics include but are not limited to N-alkyl-2-pyrrolidones such as cyclohexyl-2-pyrrolidone, N-methyl-2-pyrrolidone, N-octyl-2-pyrrolidone, and mixtures thereof.

In some embodiments, graphene is produced by exfoliation of graphite, e.g., by chemical, physical, or other means. See, e.g., U.S. Pat. No. 6,667,100. In some embodiments, graphene is produced from graphite using physical methods such as using an adhesive surface to remove graphene sheets from graphite and/or abrading graphite. In some embodiments, graphene is produced from graphite by sonication.

In some embodiments, graphene is synthesized (e.g., de novo). For example, in some embodiments graphene is epitaxially grown on various substrates, e.g., a silicon carbide (SiC) or iridium (Ir) substrate. In some embodiments, graphene is produced by transfer from nickel. In some embodiments, graphene is produced by chemical vapor deposition on thin nickel or copper films, e.g., using methane, ethane, propane, etc. as a carbon source.

In some embodiments, graphene is produced by reduction of graphite oxide. In some embodiments, graphene is produced by growth in metal-carbon melts, for example, by dissolving carbon atoms inside a transition metal melt at a certain temperature and then allowing the dissolved carbon to precipitate out at lower temperatures as graphene. Methods for production of graphene include, e.g., reduction of ethanol by sodium metal, followed by pyrolysis of the ethoxide product, and washing with water to remove sodium salts from the graphene product. Also, graphene can be produced by the exothermic combustion reaction of certain Group I and II metals, including magnesium, and carbon bearing gases, including carbon dioxide. In addition, nanotubes and graphene sheets are interconvertible. That is, by "cutting" (e.g., by action of potassium permanganate and sulfuric acid or by plasma etching) along the length of a carbon nanotube the tube may "unroll" to from a graphene sheet.

The graphite used to make graphene (and/or other carbon nanomaterials) may be natural or synthetic. The graphite may be in the alpha (hexagonal) and/or beta (rhombohedral) forms, and may be either flat or buckled. The alpha form is convertible to the beta form through mechanical treatment; the beta form is convertible to the alpha form by heating above 1300° C. Natural graphite (e.g., obtained by mining and purification of graphite-containing rock) may be, e.g., crystalline flake graphite, amorphous graphite, lump graphite (also called vein graphite), or mixtures of these forms. Synthetic graphite may be, e.g., high-quality (e.g., highly ordered pyrolytic graphite or highly oriented pyrolytic graphite with an angular spread between the graphite sheets of less than 1°. Synthetic graphite may be produced by heating carborundum, e.g., to temperatures above 4000° C. In some embodiments, the graphite is produced by recycling graphite-containing manufactures (e.g., electrodes). Commercial sources of graphite include, e.g., Technical Grade Graphite from Sargent Chemical Company; a common, commercial 350 Mesh Mr. Zip Graphite Powder from AGS Corporation of Michigan; Asbury Carbons A-625 synthetic graphite; and/or synthetic graphite powder from, e.g., Sigma-Aldrich.

Solvents for use with carbon nanotubes (e.g., multiwall carbon nanotubes or single wall carbon nanotubes) are characterized by a Flory-Huggins parameter (chi value) of approximately less than −0.08 and have a surface tension of approximately 37 mJ/m$^2$ to and 40 mJ/m$^2$ to. Exemplary solvents for carbon nanotubes that have these characteristics include but are not limited to N-alkyl pyrrolidones such as cyclohexyl-2-pyrrolidone, N-methyl-pyrrolidone, N-ethyl-pyrrolidone, N-octyl-pyrrolidone, and mixtures thereof. Some suitable solvents for functionalized carbon nanotubes, e.g., functionalized with octyl decanoic acid, are, e.g., $CH_2Cl_2/CHCl_2$, chloroform, tetrahydrofuran, or $\sigma$ $C_6H_4Cl_2$.

Methods for determining a suitable solvent or solvent system for two different materials, e.g., graphene and carbon nanotubes, are provided in U.S. Pat. Appl. Pub. No. 2011/0117361. For example, the technology comprises use of solvents to dissolve or disperse various combinations of graphene and other nanocarbon particles (e.g., carbon nanotubes). In particular, the solvents can simultaneously dissolve graphene and carbon nanotubes, for example, allowing thermodynamic mixing of the two for high degrees of homogeneity. In one example, a solvent may be optimized for the material that is less easily dissolved (for example, graphene) which nevertheless overlaps as a solvent for the other material that is more readily dissolved (for example, carbon nanotubes). Alternatively, a solvent may be optimized for the combination. In addition, one or more of the carbon allotropes may be functionalized to shift the solvency of one material to match that of the other carbon allotropes.

Methods for producing fullerenes (e.g., U.S. Pat. Appl. Pub. No. 2005/0067349), carbon nanotubes (e.g., U.S. Pat. Appl. Pub. Nos. 2007/0009909; 2004/0038251; 20060231399; and Krupke, et al (2003) *Science* 301: 344-347) are incorporated herein by reference.

In some embodiments of the technology described herein, one or more of the nanomaterials is a pristine nanomaterial. For example, in some embodiments, one or more of the nanomaterials is a pristine graphene or is pristine nanotubes, e.g., as described in U.S. Pat. Appl. Pub. No. 2011/0117361, which is incorporated herein by reference in its entirety. For example, some embodiments provide that one or more of the nanomaterials is a pristine graphene exfoliated from graphite, e.g., according to a method described in U.S. Pat. Appl. Pub. No. 2011/0117361. In some embodiments, one or more of the nanomaterials is a carbon oxide such as graphite oxide.

In some embodiments, one or more of the nanomaterials is an inorganic nanomaterial such as a silicon nanosphere, a metal nanoparticle (e.g., gold, silver, platinum, or other metal), an aluminosilicate, a clay or a layered silicate (e.g., montmorillonite, hectorite, saponite, fluoromica, fluorohectorite, kaolinite, magadiite, vermiculite, mica, talc, etc.), $ZnO$, $TiO_2$, $Mg(OH)_2$, $CaCO_3$, $MgO$, zirconate (e.g., lead zirconate), iron oxide, a silica nanoparticle, a metal chalcogenide (e.g., $(PbS)_{1.8}(TiS_2)_2$, $MoS_2$), a metal phosphate (e.g., $Zr(HPO_4)_2$), a layered double hydroxide (e.g., $M_6Al_2(OH)_{16}CO_3 \cdot nH_2O$; M=Mg, Zn), imogolite, molybdenum sulfide, boron nitride nanotubes, planar hexagonal boron nitride, cubic boron nitride, organoclays.

In some embodiments, one or more of the nanomaterials is functionalized, for example with a catalyst or by using an autocatalytic deposit of a metal or of particles attached to metals. Functionalization may be used to attach the nanomaterial to other structures such as quantum dots or photoactive compounds.

Compositions according to the technology comprise two or more nanomaterials that have distinctly different morphologies. For example, in some embodiments one nanomaterial has a morphology that is a sheet (e.g., a graphene) and the other nanomaterial has a morphology that is a tube (e.g., a nanotube). Differences in morphology include, but are not limited to, differences in shape and/or size. In particular, nanomaterials in same embodiments have a morphology that is substantially two-dimensional or planar (e.g., a graphene), substantially cylindrical or tubular (e.g., a nanotube), or substantially spherical (e.g., a fullerene, a graphite nanoparticle). Accordingly, the technology encompasses nanocomposites comprising a nanomaterial in more than one of these classes of morphology. Other classes of morphologies that are contemplated by the technology are, for example, corrugated or pleated, cup-shaped, ellipsoidal, polyhedral, spiral, conical, toroidal, prismatic, caged, conical frustum, linear, and branched.

Differences in morphology may be described in functional terms. For example, the technology provides compositions of two or more nanomaterials that have different morphologies sufficient to prevent aggregation, either self-aggregation or co-aggregation (that is, aggregation of one nanomaterial with at least one other nanomaterial), of the nanomaterials in the polymeric nanocomposite.

In some embodiments, the nanomaterials are selected from the same morphological group, but the two or more nanomaterials are sufficiently different in size to prevent aggregation, either self-aggregation or co-aggregation, of the nanomaterials in the polymeric nanocomposite. In some embodiments, the nanomaterials are selected from the same morphological group, but the two or more nanomaterials are sufficiently different in their particular shape to prevent aggregation, either self-aggregation or co-aggregation, of the nanomaterials in the polymeric nanocomposite. For example, two nanomaterials having a nanotube shape—one that is tall and narrow and a second that is short and wide—are contemplated as two nanomaterials that are sufficiently different in their particular shape within the same morphological class to prevent aggregation, either self-aggregation or co-aggregation, of the nanomaterials in the polymeric nanocomposite.

In some embodiments, one or both nanomaterials is functionalized to provide the differences in morphology that prevent aggregation. For example, in some embodiments a pristine graphene nanomaterial and a functionalized graphene material have differences in morphology that minimize or eliminate aggregation in a polymer nanocomposite material.

The technology relates to polymer nanocomposites. For example, polymerization or solidification of the solvent can also be used directly on the solution to provide for three dimensional composite materials having a more uniform distribution of carbon structures for strength or improved electrically conductive properties in that composite material. Electrically conductive composite materials having a relatively high electrical resistivity may be used for protection against static electricity and electrical shielding. Electrically conductive composite materials having relatively low electrical resistivity may be used for printed wiring and the like. Carbon nanotubes and/or graphene can be mixed into a polymer and then the solvent evaporated to provide the above properties of improved strength and/or increased electrical conductivity. Sheets of graphene can be mixed into a polymer and then the solvent evaporated to provide the above properties of improved strength and/or increased electrical conductivity.

As such, embodiments of the technology are not limited in the polymer used to prepare the nanocomposite. The polymer may be, for example, a thermoplastic, a thermoset, and/or an elastomer. In some embodiments, the polymer is an epoxy. In some embodiments, the polymer is a polypropylene. However, the technology is not limited in the polymer that is used to make the polymer nanocomposite. In some embodiments, the polymer is a polyester (e.g., poly (ethylene terephthalate) or an unsaturated polyester resin), a poly ether ether ketone, a polystyrene, a polyvinyl, a polyimide, a polydimethylsiloxane, a polyolefin, a polycarbonate, a nitrile rubber, poly(styrene-co-acrylic acid), polyurethane, silicone, poly(ethylene-co-vinyl acetate), poly (methylmethacrylate), butyl rubber, polyamide, acrylic rubber, poly(N-vinyl pyrrolidone), poly(ethylene oxide), ethylene-propylene-diene monomer rubber, natural rubber, styrene butadiene rubber, poly(ethylene-co-octene), halobutyl rubber, silylated-sulfonated poly(ether ether ketone), poly(benzimidizole), fluorinated poly(benzimidizole), sulfonated polystyrene ethylene butylene polystyrene, hydroxylated polymers, hyperbranched polymers, cross linked sulfonated poly(ether ether ketone), sulfonated polybenzimidazole copolymer, phosphoric acid doped polybenzimidazole, sulfonated polyarylenethioethersulfone, sulfonated polybenzimidazole, poly(phenylene-vinylene), polythiopene, polyfluorene, polyaniline, polypyrrole, polyamidoamine dendrimer, polyacrylamide, and poly styrene butadiene.

In addition, the technology finds use with biomolecules such as proteins, DNA, RNA, lipids, sugars, and crystalline cellulose.

The technology encompasses compositions comprising at least two nanomaterials over a range of weight ratios. For example, in some embodiments the compositions comprise a first and a second nanomaterial at a weight ratio of 1:60 to 60:1, e.g., 1:60, 1:55, 1:50, 1:45, 1:40, 1:35, 1:30, 1:25, 1:20, 1:15, 1:10, 1:5, 1:4, 3:10, 1:3, 1:2, 1:1, 2:1, 3:1, 10:3, 4:1, 5:1, 10:1, 15:1, 20:1, 25:1, 30:1, 35:1, 40:1, 45:1, 50:1, 55:1, 60:1, and intermediate ratios therebetween. Furthermore, the resulting polymer nanocomposite is not limited in the relative or absolute amounts of the first nanomaterial, the second nanomaterial, and the polymer in the compositions provided. In some embodiments, the nanomaterial (total nanomaterial, e.g., the first and second, and in some embodiments, additional, nanomaterials) is present in a weight percentage of 0.1%, 0.2%, 0.3%, 0.4%, 0.5%, 0.6%, 0.7%, 0.8%, 0.9%, 1%, 2%, 3%, 4%, 5%, 6%, 7%, 8%, 9%, 10%, 20%, 30%, 40%, 50% or more of the polymer nanocomposite. In some embodiments, the compositions are cured by the addition of a curing agent.

In some embodiments, the compositions are produced by a method as described below.

2. Methods

Polymer nanocomposite compositions are produced using, e.g., controlled mixing and/or compounding, stabilization of the achieved dispersion, and/or orientation of the dispersed phase. Accordingly, provided herein are embodiments of methods for producing a polymer nanocomposite. The technology provides methods for producing a polymer nanocomposite by preparing a solution or dispersion of a nanomaterial such as a solution or dispersion of graphene nanoplatelets. In some embodiments, the graphene is produced by exfoliation in a solvent, e.g., N-methylpyrrolidone. In some embodiments, the nanomaterial is a pristine nanomaterial (e.g., pristine graphene). An exemplary method of producing graphene from graphite is provided is U.S. Pat. Appl. Pub. No. 2011/0117361. Then, a second nanomaterial (e.g., having a different morphology than the first nanomaterial, e.g., a carbon nanotube, e.g., a multiwall carbon nanotube) is added to the solution or dispersion of the first nanomaterial and mixed. In some embodiments, the solution or dispersion of the first and second nanomaterial is high-shear mixed (e.g., for 10 minutes, for 20 minutes, for 30 minutes, for 1 hour, for 2 hours or more) at, e.g., 5000 rpm; 7500 rpm; 8000 rpm; 10,000 rpm or more. In some embodiments a high-shear mixing screen is used for the high-shear mixing. In some embodiments, the mixing is performed in an inert gaseous environment, e.g., under a dry nitrogen atmosphere. The technology encompasses compositions comprising at least two nanomaterials covering a range of weight ratios. For example, in some embodiments the first and second nanomaterials are mixed at a weight ratio of 1:60 to 60:1, e.g., 1:60, 1:55, 1:50, 1:45, 1:40, 1:35, 1:30, 1:25, 1:20, 1:15, 1:10, 1:5, 1:4, 3:10, 1:3, 1:2, 1:1, 2:1, 3:1, 10:3, 4:1, 5:1, 10:1, 15:1, 20:1, 25:1, 30:1, 35:1, 40:1, 45:1, 50:1, 55:1, 60:1, and intermediate ratios therebetween. Next, a step is performed to remove a portion (e.g., more than 50%, more than 75%, more than 90%, or more than 95% or more) of the solvent from the resultant dispersed solution of the first and second nanomaterials. For example, some embodiments provide that the dispersed solution of the first and second nanomaterials is suction filtered, e.g., in a Buchner funnel in which is placed a filter membrane (e.g., a 0.45-μm cutoff nylon membrane). Solvent removal produces a wet cake of mixed nanomaterials. In some embodiments, the wet cake of nanomaterials is washed, e.g., by washing in acetone and removing the acetone by suction filtration, e.g., in a Buchner funnel in which is placed a filter membrane (e.g., a 0.45-μm cutoff nylon membrane).

The washed wet cake of mixed nanomaterials or nanomaterial/solvent dispersion is then mixed into a liquid monomer or polymer in solvent. In some embodiments, the nanomaterial wet cake is mixed into liquid monomer of a thermoset resin, residual solvent is removed, and hardener is added to polymerize monomer as needed with heating as necessary. In some embodiments, the nanomaterial/solvent dispersion is mixed with a solution of a thermoplastic polymer in solvent, and solvent is removed to isolate the solvent-free polymer composite. In some embodiments, the liquid polymer is an uncured polymer resin. In some embodiments, the liquid polymer is a melted polymer. In some embodiments, the melted polymer is dissolved in a solvent, e.g., xylene. For example, some polymers are provided by dissolving them in a heated solvent, e.g., by stirring into heated xylenes or other solvent. In some embodiments, the polymer/nanomaterial mixture is diluted, e.g., in a solvent (e.g., acetone), prior to mixing. In some embodiments, the mixing is high-shear mixing. In some embodiments, the mixing is performed for 5 minutes, for 10 minutes, for 30 minutes, for 1 hour, for 2 hours or more at, e.g., 500 rpm; 1000 rpm; 2000 rpm; 5000 rpm or more. In some embodiments, a high-shear mixing screen is used for the high-shear mixing. After the nanomaterials are dispersed throughout the polymer and solvent solution, the solvent is removed. In some embodiments, heat is applied to remove the solvent (e.g., by evaporation). In some embodiments, the dispersion is heated to more than 30° C., more than 40° C., more than 50° C., more than 60° C., more than 70° C., more than 80° C. or more. In some embodiments, a reduced pressure is used to remove the solvent (e.g., by suction and/or placing in an evacuated environment, e.g., at less than 760 mmHg, at less than 500 mmHg, at less than 250 mmHg, at less than 100 mmHg, at less than 50 mmHg, at less than 25 mmHg or less). In some embodiments, solvent is removed by a rotatory evaporator. After solvent removal, a nanomaterial polymer nanodispersion is produced.

In some embodiments of the methods, the nanomaterial polymer nanodispersion is cured, e.g., by heating at 80° C., 100° C., 120° C. or more for 1 minute, 5 minutes, 15 minutes, 30 minutes, 1 hour, 2 hours, 5 hours, or 10 hours or more. In some embodiments, a hardener is added and mixed into the nanomaterial polymer nanodispersion to cure the nanomaterial polymer nanodispersion. In some embodiments, the nanomaterial polymer nanodispersion is produced by removing a solvent, e.g., by heat and/or reduced pressure (e.g., temperatures from 40° C. to 150° C. and at pressures of 10 to 200 mmHg).

The technology encompasses nanomaterial polymer nanodispersions comprising a range of weight ratios of polymer to nanomaterial (e.g., polymer to first nanomaterial to second nanomaterial). Prior to curing, the nanomaterial polymer nanodispersion can be added to additional polymer to provide a nanomaterial polymer nanodispersion at a desired ratio of polymer to nanomaterial. For example, 1 part of the nanomaterial polymer nanodispersion can be mixed with 1 part, 2 parts, 5 parts, 10 parts, or 20 or more parts (and intermediate values between these particular ratios) of the polymer to provide a desired ratio of polymer to nanomaterial. The resulting polymer nanocomposite is not limited in the relative or absolute amounts of the first nanomaterial, the second nanomaterial, and polymer in the compositions. In some embodiments, the nanomaterial (total nanomaterial, e.g., the first and second, and in some embodiments, additional, nanomaterials) is present in a weight percentage of 1%, 3%, 5%, 10%, 20%, 50% or more of the polymer nanocomposite. The nanocomposites may be further transformed into a desired shape, e.g., by melt pressing.

3. Uses

The polymer nanocomposites provided herein find use in many applications. For example, some uses include providing an electrically conductive polymer nanocomposite that has a relatively high electrical resistivity for use in protection against static electricity and as an electrical shielding material. Also, an electrically conductive polymer nanocomposite material having a relatively low electrical resistivity may be used for electromagnetic shielding (e.g., electromagnetic shielding that blocks radio frequency electromagnetic radiation (RF shielding) and/or electromagnetic shielding that minimizes electromagnetic interference (EMI shielding)), printed wiring, in batteries, in photoelectric devices (e.g., solar cells), etc.

A flame retardant material may be produced, e.g., by dispersing nanomaterials (e.g., graphene and carbon nanotubes) in a solvent and then introducing the solvent into a polymer matrix.

A polymer nanocomposite finds use in the preparation of fibers having a high strength, resiliency, and/or elasticity. Such fibers find use, e.g., in the preparation of textiles, ropes, and the like. The polymer nanocomposites also find use in the preparation of activated carbon filters.

In addition, characteristics of conventional polymers are enhanced by the current technology. For example, the polymer nanocomposites find use in the production of rubber, e.g., for tires. Tires made from a polymer nanocomposite according to the technology (e.g., incorporating graphene and carbon nanotubes) have an improved dispersion of heat that otherwise limits the life of the tire. In some embodiments, polymer nanocomposites attenuate incident ultraviolet radiation; as such, polymer nanocomposites find use as a material to provide ultraviolet resistance, e.g., to minimize or eliminate degradation of a polymer from exposure to ultraviolet radiation.

Polymer nanocomposites find use as a synthesis scaffold for building biological materials, for example at the cell level, or for other chemical or biological syntheses.

EXAMPLES

Example 1

Preparation of a Polymer Nanocomposite

During the development of embodiments of the technology, polymer nanocomposites comprising graphene nanoplatelets and multiwall carbon nanotubes were produced and tested.

1. Materials and Methods

Exfoliated graphene nanoplatelets (2.02 g) were prepared as a 0.57% solution or dispersion in N-methylpyrrolidone (NMP, Sigma-Aldrich, HPLC grade) from synthetic graphite (Sigma-Aldrich, <20 µm particle size) using solvent exfoliation methods described in U.S. Pat. Appl. Pub. No. 2011/0117361, which is incorporated herein by reference. Multiwall carbon nanotubes (MWCNT, 0.202 g, Nanocyl NC7000 series) were added to the solution or dispersion of graphene nanoplatelets and the mixture was high shear mixed under a dry nitrogen atmosphere for 60 minutes at 8,000 rpm using a Silverson L5M-A lab mixer with the standard mixing assembly fitted with a square hole high shear mixing screen. The resultant dispersion containing a 10:1 weight ratio of coexfoliated graphene nanoplatelets to MWCNTs was used to make epoxy nanocomposites as described below. A second dispersion of coexfoliated graphene nanoplatelets and MWCNTs was prepared similarly by adding 1.002 g of Nanocyl NC7000 series MWCNTs to a 0.62% graphene solution or dispersion in NMP containing 3.34 g of graphene nanoplatelets. The resultant dispersion containing a 10:3 ratio of graphene nanoplatelets to MWCNTs was used to make polypropylene nanocomposites as described below.

A dispersion containing coexfoliated graphene nanoplatelets (2.02 g) and MWCNTs (0.202 g) prepared as described above was suction filtered in a Buchner funnel using a 0.45 µm nylon membrane filter to remove most of the solvent and leaving a wet cake of the nanomaterial mixture. The nanomaterial mixture wet cake was washed with acetone (Sigma-Aldrich, ACS reagent grade) with continued suction filtration to remove excess acetone. The resultant wet cake was stirred into liquid epoxy resin (20.0 g, Dow DER 332). The resin was diluted with approximately 40 mL of acetone, and the mixture was high shear mixed for 20 minutes at 2000 rpm using a Silverson L5M-A lab mixer with the standard mixing assembly fitted with a square hole high shear mixing screen. The resultant dispersion was heated in an open beaker on a hot plate at about 50° C. until all the acetone was evaporated. The resultant epoxy resin nanodispersion was divided into sample aliquots. One aliquot was mixed with epoxy hardener (Dow, DEH 20) poured onto foil in a thin layer (about 2 mm thickness) and cured by heating on a hot plate at 120° C. for 2 hours. Additional cured test samples with lower loadings of the nanomaterials were made by diluting the other aliquots with 1 part, 2 parts, and 5 parts of the epoxy resin before adding the hardener and curing the samples. All samples were tested for electrical resistivity using a Static Solutions RT-1000 Megohmmeter.

A dispersion containing coexfoliated graphene nanoplatelets (3.34 g) and MWCNTs (1.002 g) in NMP, prepared as described above, was divided into two aliquots and each aliquot was mixed with a 2.5% solution of 120 melt polypropylene (PP) dissolved in hot xylenes (Sigma-Aldrich, ACS reagent grade) by stirring the polymer pellets in boiling xylenes until completely dissolved. The ratios of the mixtures were adjusted so that one mixture would produce a 3% nanocarbon/PP composite on a dry weight basis and the other would produce a 10% nanocarbon/PP composite on a dry weight basis. Each mixture was then high shear mixed for 5 minutes at 6000 rpm using a Silverson L5M-A lab mixer with a 1 inch tubular mixing assembly fitted with a square hole high shear mixing screen. The solvents were then removed from the two mixtures by rotary evaporation at ~10 mm Hg pressure and temperatures of approximately 45° C., leaving a wet cake containing about 50% solids. The wet cakes were transferred to aluminum drying pans and dried in a vacuum oven at approximately 50 mm Hg pressure and 100° C. to 120° C. to provide solvent-free graphene/MWCNT/PP composites containing nanocarbon loadings of 3% and 10%. The composites were melt pressed into test plaques of about 1.5 mm thickness, cooled to room temperature, and tested for electrical resistivity using a Static Solutions RT-1000 Megohmmeter.

2. Results

Electrical resistivity data for the epoxy composite samples are summarized in FIG. 1, which shows electrical resistivity as a function of carbon nanomaterial loading for the coexfoliated graphene/MWCNT/epoxy composites compared to similarly prepared composites containing only graphene nanoplatelets.

The composites containing coexfoliated graphene/MWCNT in a 10:1 ratio show a much lower loading threshold for significant electrical conductivity (inverse of electrical resistivity) than the composites containing only graphene. Electrical conductivity in the electrostatic dissipation (ESD) range (corresponding to resistivities less than $1.0 \times 10^8$ Ohm-cm) is achieved at 1.7% loading for the coexfoliated graphene/MWCNT composites, whereas a much higher loading of about 8.5% is required to achieve electrical conductivity in the ESD range with the composites containing only graphene.

In addition, the data indicate that the coexfoliated graphene/MWCNT form an interactive electrical network that is much more efficient than the additive contribution of each nanomaterial alone. In particular, the data show that the composite containing coexfoliated graphene/MWCNT at a 1.7% loading (1.55% graphene and 0.15% MWCNT) has an electrical resistivity that is about 5 orders of magnitude lower than the electrical resistivity obtained with 1.55% graphene alone and several orders of magnitude lower than that predicted for 0.15% MWCNT alone.

Figure 2:
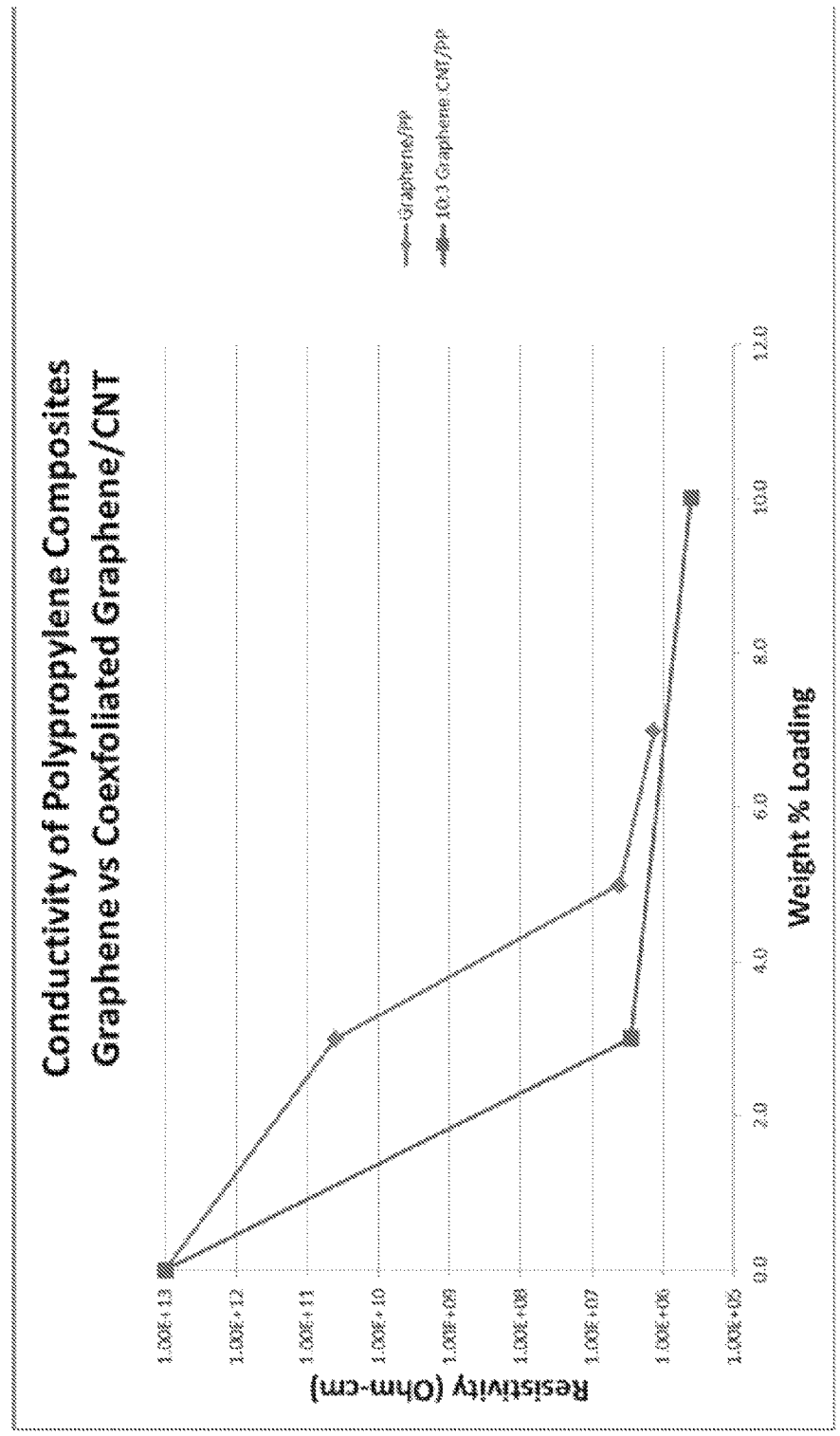
FIG. 2 is a plot showing the relationship between electrical resistivity and weight percent loading of an embodiment of a polypropylene polymer nanocomposite according to the technology compared to a conventional polymer nanocomposite.

Electrical resistivity data for the polypropylene composite samples are summarized below in FIG. 2, which shows electrical resistivity as a function of carbon nanomaterial loading for the coexfoliated graphene/MWCNT/PP composites compared to similarly prepared composites containing only graphene nanoplatelets.

The composites containing coexfoliated graphene/MWCNT in a 10:3 ratio show a much lower loading threshold for significant electrical conductivity (inverse of electrical resistivity) than the composites containing only graphene. Electrical conductivity in the electrostatic dissipation (ESD) range (corresponding to electrical resistivities of less than $1.0 \times 10^8$ Ohm-cm) is achieved at about a 2.5% loading for the coexfoliated graphene/MWCNT composites whereas a higher loading of about 4.5% is required to achieve electrical conductivity in the ESD range with the composites containing only graphene.

In addition, the data indicate that the coexfoliated graphene/MWCNT form an interactive electrical network that is much more efficient than the additive contribution of each nanomaterial alone. In particular, the data show that the composite containing coexfoliated graphene/MWCNT at a 3.0% loading (2.3% graphene and 0.7% MWCNT) has an electrical resistivity that is about 5 orders of magnitude lower than the electrical resistivity obtained with 2.3% graphene alone and several orders of magnitude lower than that predicted for 0.7% MWCNT alone.

Example 2

Preparation of Co-exfoliated Graphene/MWCNT Dispersions at Various Ratios of Graphene:MWCNT During the development of embodiments of the technology provided herein, compositions comprising co-exfoliated graphene and MWCNT were prepared at various ratios of graphene to MWCNT. Exfoliated graphene nanoplatelets were prepared from synthetic graphite (Asbury A625, <75 µm particle size) as dispersions in N-methylpyrrolidone (NMP, Sigma-Aldrich, HPLC grade) using solvent exfoliation methods described in U.S. Pat. Appl. Pub. No. 2011/0117361, which is incorporated herein by reference. Multi-wall carbon nanotubes (MWCNT, Nanocyl NC7000 series) were added to the dispersions of graphene nanoplatelets. The mixtures were high shear mixed under a dry nitrogen atmosphere for 60 minutes at 8,000 rpm using a Silverson L5M-A lab mixer with the standard mixing assembly fitted with a square hole high shear mixing screen. Additional NMP solvent was added to the dispersions as needed to control viscosity and to ensure complete mixing. Dispersions were prepared containing a range of graphene to CNT ratios and concentrations as detailed in Table 1.

TABLE 1

Co-exfoliated mixtures of graphene and carbon nanotubes prepared in N-methylpyrrolidone

| graphene:CNT | graphene mass (g) | initial graphene concentration (wt %) | CNT mass (g) | final graphene concentration (wt %) | final CNT concentration (wt %) |
|---|---|---|---|---|---|
| 3:1  | 9.375  | 1.29 | 3.125 | 0.486 | 0.162 |
| 10:1 | 11.362 | 1.29 | 1.138 | 0.545 | 0.182 |
| 12:1 | 1.846  | 0.51 | 0.154 | 0.242 | 0.081 |
| 14:1 | 1.866  | 0.51 | 0.134 | 0.243 | 0.081 |
| 16:1 | 1.883  | 0.51 | 0.117 | 0.244 | 0.081 |
| 18:1 | 1.895  | 0.51 | 0.105 | 0.245 | 0.082 |
| 20:1 | 1.905  | 0.39 | 0.095 | 0.214 | 0.071 |
| 30:1 | 1.935  | 0.39 | 0.065 | 0.216 | 0.072 |
| 40:1 | 1.951  | 0.39 | 0.049 | 0.217 | 0.072 |
| 50:1 | 1.961  | 0.39 | 0.039 | 0.217 | 0.072 |

The resultant dispersions were used to make epoxy nanocomposites as described below.

Example 3

Preparation of Epoxy Nanocomposites Containing Various Ratios of Graphene:MWCNT During the development of embodiments of the technology described herein, dispersions containing coexfoliated graphene nanoplatelets and MWCNTs were prepared as described above and having the compositions provided in Table 1. Then, the dispersions were suction filtered in a Buchner funnel using a 0.45-μm nylon membrane filter to remove most of the solvent leaving a wet cake of each nanomaterial mixture. Next, the wet cakes were washed with actetone (Sigma-Aldrich, ACS reagent grade) with continued suction filtration to remove excess acetone. The resultant wet cakes were stirred into amounts of liquid epoxy resin (Dow DER 332) to produce final total carbon loadings of 10% by weight in the cured epoxy composites. Each resin was diluted with approximately 40 ml of acetone and high shear mixed for one hour at 5,000 rpm using a Silverson L5M-A lab mixer with the standard mixing assembly fitted with a square hole high shear mixing screen. The resultant dispersion was transferred to a round bottom flask and the acetone was removed at reduced pressure on a Buchi R-200 rotary evaporator with continued heating at 95° C. to remove the residual solvent (e.g., NMP).

Each resultant epoxy resin nano dispersion was divided into aliquots. One aliquot was mixed with epoxy hardener (Dow, DEH 20), poured onto foil in a thin layer (e.g., having a thickness of approximately 2 mm), and cured by heating on a hot plate at 120° C. for 4 hours. Additional cured test samples with lower loadings of the nanomaterials were prepared by diluting the remaining aliquots with 1 part, 2 parts, and 5 parts of the epoxy resin before adding the hardener and curing the samples.

Example 4

Figure 3:
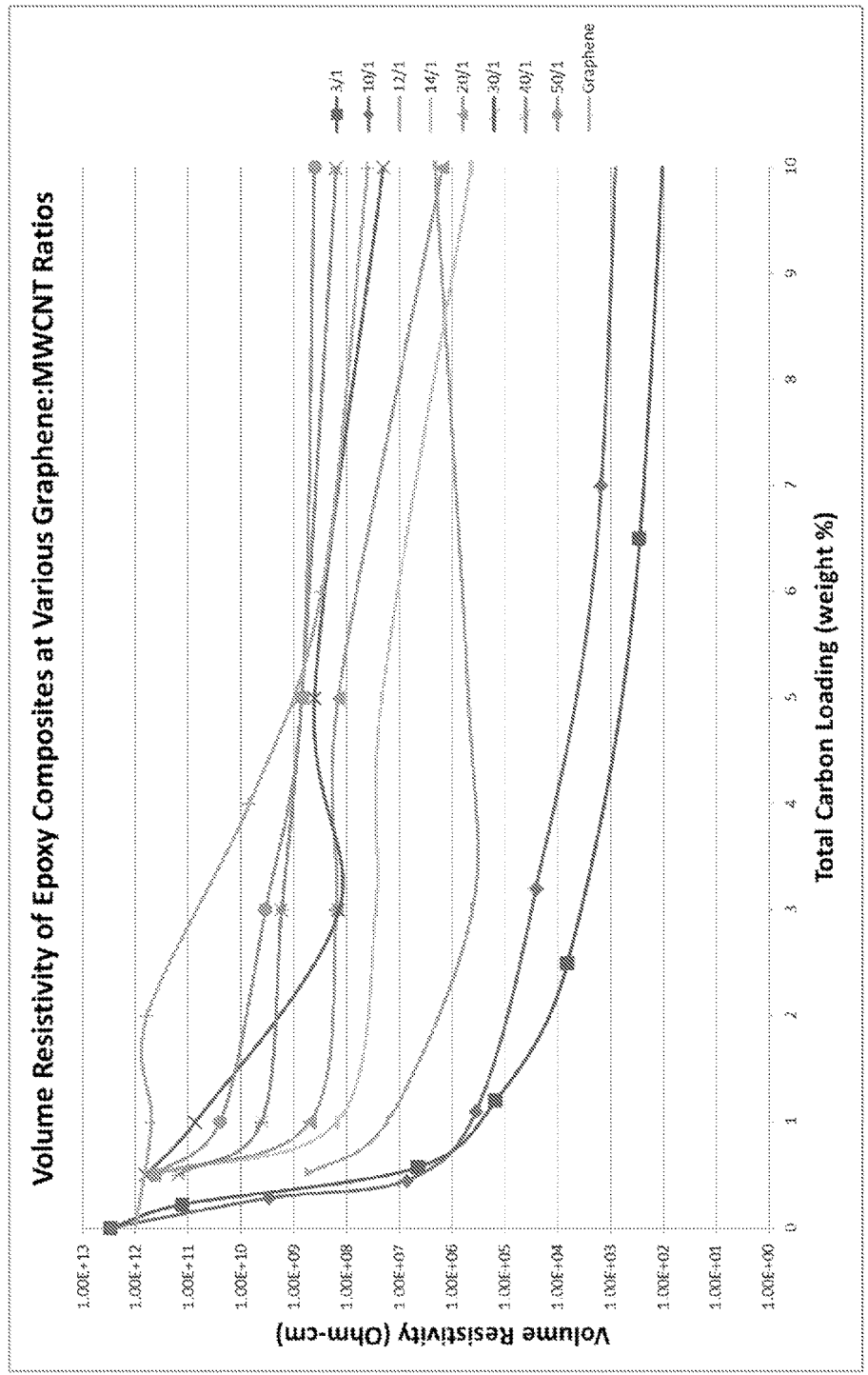
FIG. 3 is a plot showing the relationship between volume electrical resistivity and total carbon loading for epoxy composites prepared according to the technology provided herein to comprise a range of graphene-to-multiwall carbon nanotube (MWCNT) ratios.

Electrical Conductivity of Epoxy Composites Containing Various Ratios of Graphene:MWCNT During the development of embodiments of the technology provided herein, epoxy nanocomposites containing various ratios of graphene:MWCNT (e.g., as prepared in Example 3) were tested for electrical resistivity using a megohmmeter (Static Solutions RT-1000). Electrical resistivity data were collected from tests of the epoxy composite samples (FIG. 3). In particular, electrical resistivity data were collected as a function of total carbon nanomaterial loading for the coexfoliated graphene/MWCNT/epoxy composites at the various graphene:MWCNT ratios (FIG. 3). The data were compared to similarly prepared composites containing only graphene nanoplatelets (FIG. 3).

At total carbon loadings of 5% and lower, all of the composites containing MWCNTs co-exfoliated with the graphene nanoplatelets showed significantly greater electrical conductivity (and lower electrical resistivity) than composites with an equal loading of graphene only (FIG. 3). The enhancement of electrical conductivity by the carbon nanotubes is unexpectedly and surprisingly large considering the minor amounts of MWCNTs present in the compositions. Moreover, the degree of electrical conductivity is sensitive to the graphene:MWCNT ratio over the ratio range of approximately 10:1 to approximately 50:1, thus providing a useful way of controlling electrical conductivity to a target range by adjusting the graphene to MWCNT ratio. For example, polymers with volume electrical resistivities less than $10^{11}$ Ohm-cm, but greater than $10^4$ Ohm-cm, have electrostatic charge dissipation (ESD) properties that are useful in many applications. The optimum electrical resistivity is application specific and thus the technology provides for adjusting the electrical resistivity of compositions as appropriate for the particular application in which the compositions are used.

The data indicate that graphene:MWCNT ratios in the range of approximately 10:1 to approximately 50:1 used with carbon loadings in the range of approximately 1% to approximately 5% provide controlled target levels of electrical conductivity across the entire ESD range (FIG. 3). Polymers with volume electrical resitivities less than approximately $10^5$ Ohm-cm but greater than approximately 10 Ohm-cm have electromagnetic interference (EMI) shielding properties useful in many applications. Further, the data indicate that a graphene:MWCNT ratio of approximately 10:1 can be used with carbon loadings above approximately 1% to provide target levels of electrical conductivity in the EMI shielding range (FIG. 3).

Example 5

Preparation of Polycarbonate Composites Containing a 3:1 Ratio of Co-exfoliated Graphene:MWCNT During the development of embodiments of the technology provided herein, experiments were conducted to test a dispersion comprising a 3:1 ratio of graphene nanoplatelets to multi-wall carbon nanotubes. In particular, a dispersion comprising a 3:1 ratio of graphene nanoplatelets to multi-wall carbon nanotubes was prepared in NMP (1.1% total carbon concentration) as described above. Then, the dispersion was concentrated approximately 4-fold by rotary evaporation at a temperature of approximately 100° C. and at a pressure of approximately 10 mmHg. Separately, a solution of poly(bisphenol A carbonate) (PC, RTP) in NMP (16% by weight) was prepared by dissolving the polymer pellets in NMP with stirring at room temperature. Portions of the graphene:MWCNT dispersion and the PC solution were then mixed in appropriate amounts to produce composites with total carbon loadings of 2.0%, 5.7%, 9.4%, and 25% after removal of solvent. Each mixture was first mixed using a bench-top orbital mixer at 400 rpm, then further mixed using a high shear mixer (Silverson L5M-A, standard mixing assembly with square hole high shear mixing screen) at 8,000 rpm for 10 minutes. An equal volume of methanol (Sigma-Aldrich, ACS reagent grade) was then added to each mixture to precipitate the polymer composite solids. The resultant slurry was centrifuged at 3,000 rpm for 30 minutes at 0° C. and the supernatant liquid was decanted to isolate the solids. The solids were washed twice with fresh methanol by adding the same volume as was added previously, followed by centrifuging and decanting. The solids were then transferred to aluminum drying pans and dried in a vacuum oven at a temperature of approximately 150° C. and at a pressure of approximately 30 mmHg. The dried composite samples were melt pressed into 1-mm thick test plaques.

Example 6

Electrical Conductivity of Polycarbonate Composites Containing 3:1 Ratio of Co-exfoliated Graphene:MWCNT During the development of embodiments of the technology provided herein, polycarbonate composites were tested for electrical resistivity. In particular, the electrical resistivity of polycarbonate composite test plaques comprising a 3:1 ratio of co-exfoliated graphene:MWCNT (e.g., as described above) were tested using a megohmmeter (Static Solutions RT-1000).

Figure 4:
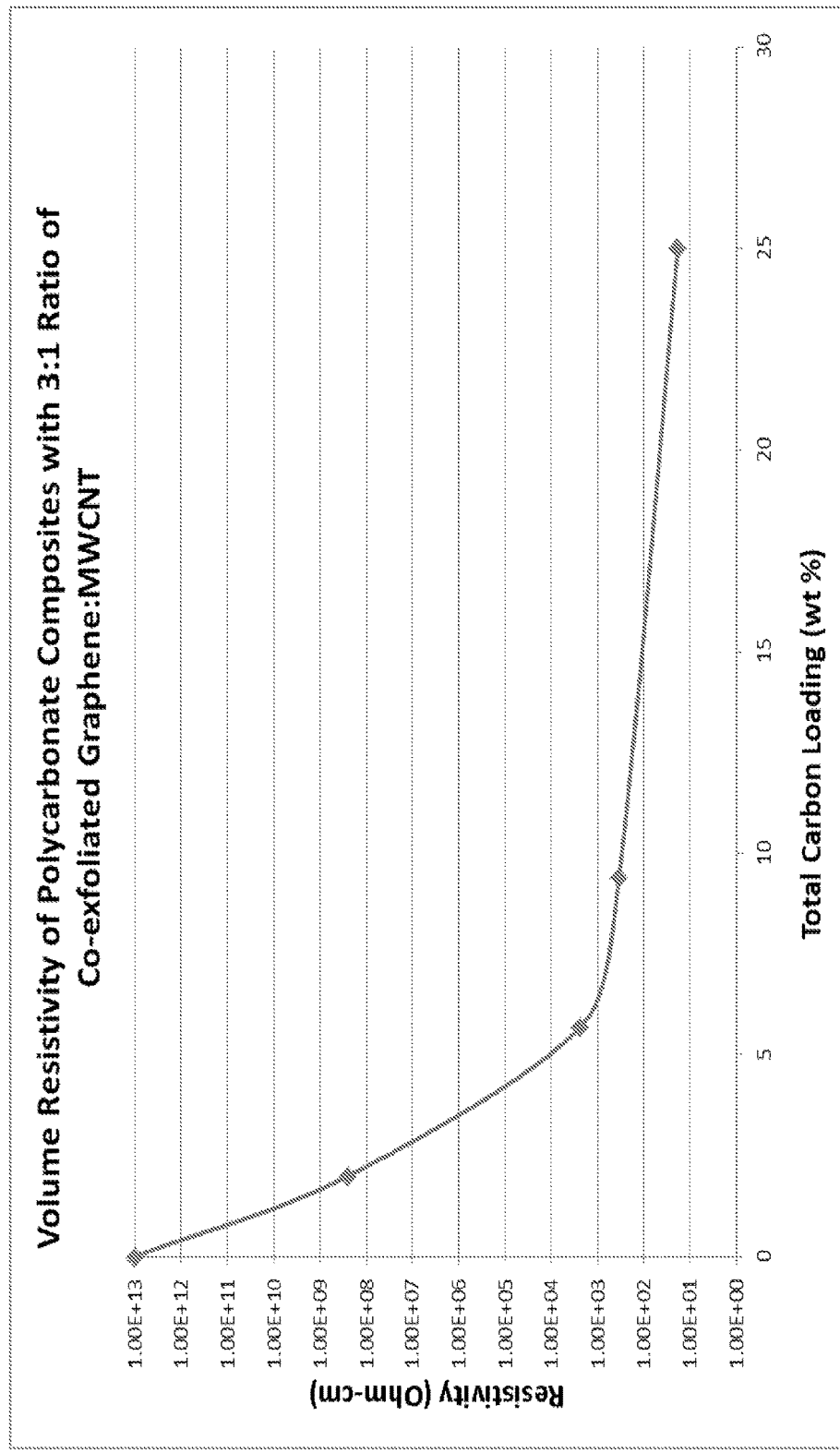
FIG. 4 is a plot showing the relationship between volume electrical resistivity and total carbon loading for a polycarbonate composite prepared according to the technology provided herein to have a 3:1 ratio of coexfoliated graphene to multiwall carbon nanotubes (MWCNT).

The data collected indicated that the electrical resistivity decreases by ten orders of magnitude as the nanomaterial loading is increased from 0% to 9.4% and further decreases by another order of magnitude as loading is increased from 9.4% to 25% (FIG. 4). Moreover, the data indicate that a 3:1 ratio of co-exfoliated graphene:MWCNT in polycarbonate at loadings from approximately 1% to 5% are useful for providing electrical conductivity throughout the ESD range, whereas loadings of 5% and greater are useful for providing electrical conductivity in the EMI shielding range (see, e.g., FIG. 4).

Example 7

Preparation of Graphene/MWCNT/PC Nanocomposites from PC Master Batch via Melt Compounding on a Micro Extruder During the development of embodiments of the technology provided herein, experiments were conducted to test a graphene/MWCNT/PC composite containing a 3:1 ratio of graphene:MWCNT and a 25% total carbon loading. In particular, a master batch comprising a graphene/MWCNT/ PC composite containing a 3:1 ratio of graphene:MWCNT and a 25% total carbon loading was prepared as described above and used to produce a series of nanocomposites with lower loadings. The master batch was mixed with PC (RTP) at various let-down ratios to produce final composites with total carbon loadings of 1.0%, 5.0%, 7.0%, and 10.0% by weight. Each of the mixed samples was melt blended on a conical twin screw micro-compounding extruder (15 ml DSM XPLORE) at a screw rotation of 100 rpm and at a temperature of 290° C. for 3 minutes and then extruded. The extrudates were molded into test bars on an injection molder (DSM XPLORE) using a feed cylinder temperature of 300° C. and a mold temperature of 100° C.

Example 8

Electrical Conductivity of Polycarbonate Composites Produced via Master Batch

Figure 5:
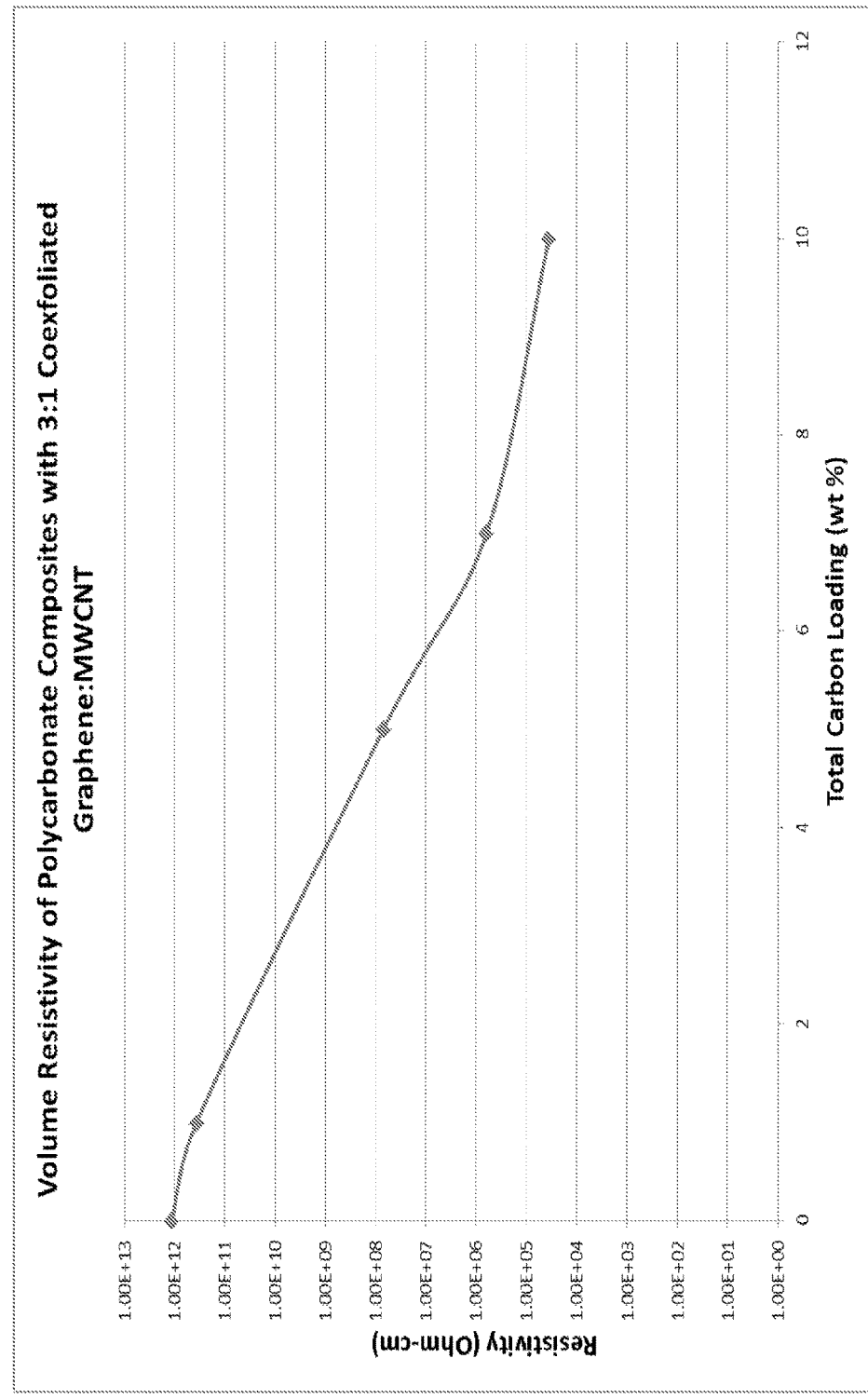
FIG. 5 is a plot showing the relationship between volume electrical resistivity and total carbon loading for a polycarbonate composite prepared to have a 3:1 ratio of coexfoliated graphene to multiwall carbon nanotubes (MWCNT) by melt compounding from a master batch comprising 25% total carbon loading.

During the development of embodiments of the technology provided herein, PC composite test bars were tested for electrical resistivity using a megohmmeter (Static Solutions RT-1000). Samples were produced via melt compounding from a master batch as described above. The electrical resistivity data collected from the experiments indicated that the test bars have an electrical resistivity that varies as a function of total carbon nanomateral loading (FIG. 5). The electrical resistivity decreases by five orders of magnitude as the nanomaterial loading is increased from 0% to 10% by weight resulting in an electrical conductivity spanning the ESD range for loadings between 1% and 10% by weight.

All publications and patents mentioned in the above specification are herein incorporated by reference in their entirety for all purposes. Various modifications and variations of the described compositions, methods, and uses of the technology will be apparent to those skilled in the art without departing from the scope and spirit of the technology as described. Although the technology has been described in connection with specific exemplary embodiments, it should be understood that the invention as claimed should not be unduly limited to such specific embodiments. Indeed, various modifications of the described modes for carrying out the invention that are obvious to those skilled in the art are intended to be within the scope of the following claims.

We claim:

1. A method of making a polymer nanocomposite containing a solvent coexfoliated mixture of pristine nanomaterials comprising two or more distinctly different particle morphologies, said method comprising the steps of:
    a) exfoliating a pristine nanomaterial by solvent exfoliation to produce a first solution or stable dispersion of a first exfoliated pristine nanomaterial;
    b) exfoliating one or more additional pristine nanomaterials of different particle morphology from the first exfoliated pristine nanomaterial with the first solution or stable dispersion of the first pristine exfoliated nanomaterial to provide a second solution or stable dispersion containing a coexfoliated mixture of pristine nanomaterials in a highly exfoliated state;
    c) introducing the second solution or stable dispersion into a polymer matrix; and
    d) removing solvents from said matrix to provide a polymer nanocomposite;
    wherein said coexfoliated mixture of pristine nanomaterials is dispersed in said polymer nanocomposite to form a nanodispersion; and wherein steps (b) and (c) are carried out by high shear mixing.

2. The method of claim 1, wherein the coexfoliated mixture of pristine nanomaterials comprises pristine graphene nanoplatelets and pristine carbon nanotubes.

3. The method of claim 1, wherein a ratio of the first exfoliated pristine nanomaterial to the one or more additional pristine nanomaterials is 1:60 to 60:1, inclusive.

4. The method of claim 1, wherein said solvent is N-alkyl-pyrrolidone.

* * * * *